Figure 4:
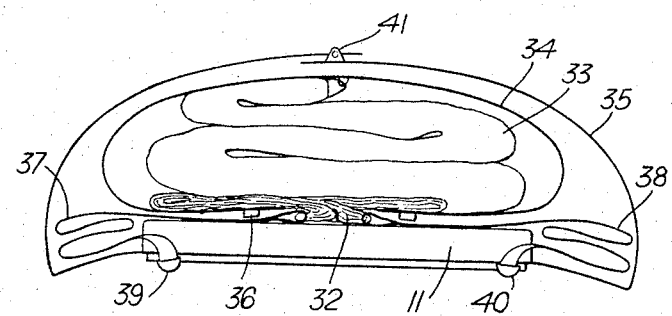

March 19, 1968  J. R. MITCHELL  3,373,960
PARACHUTES
Filed July 25, 1966  3 Sheets-Sheet 1
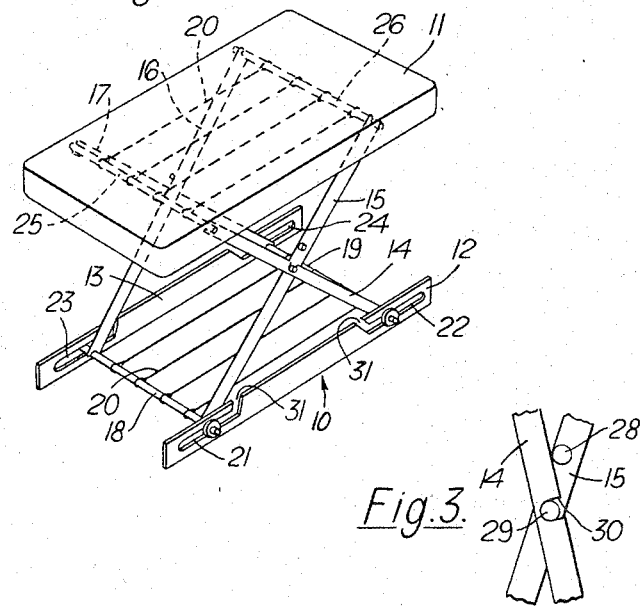
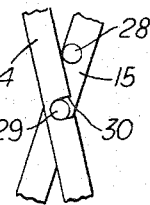
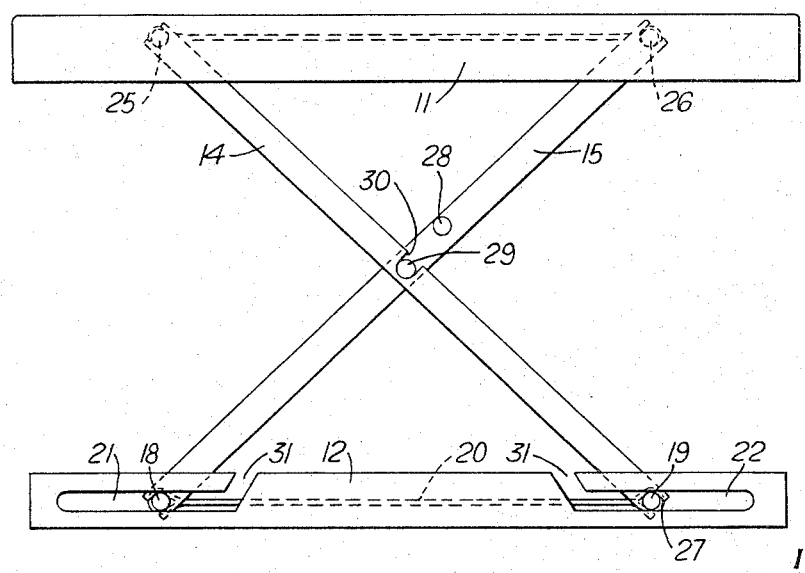
Inventor
JOHN ROTHWELL MITCHELL
By
Shoemaker and Mattare
Attorneys March 19, 1968

J. R. MITCHELL 3,373,960

PARACHUTES

Filed July 25, 1966

3 Sheets-Sheet 2

Inventor
JOHN ROTHWELL MITCHELL
By
Shoemaker and Mattare
Attorneys

March 19, 1968 J. R. MITCHELL 3,373,960
PARACHUTES
Filed July 25, 1966 3 Sheets-Sheet 3
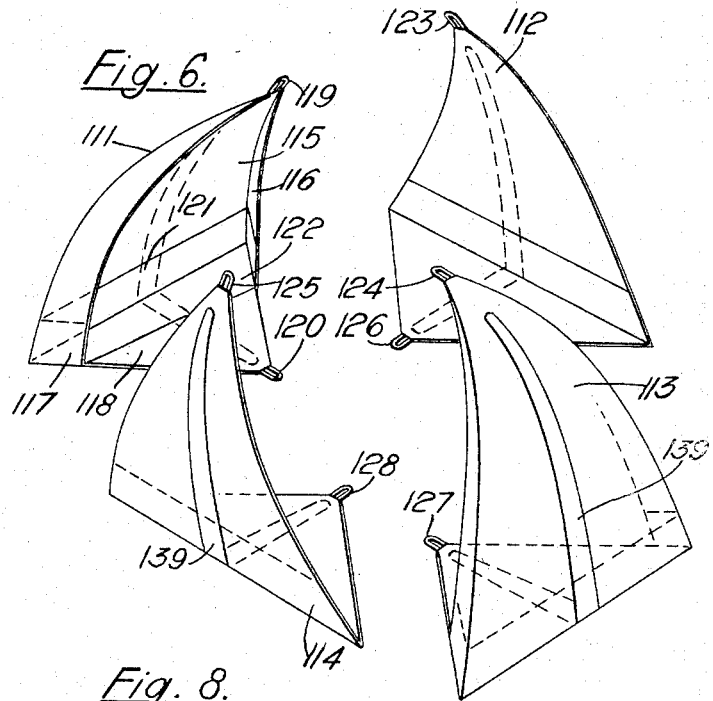
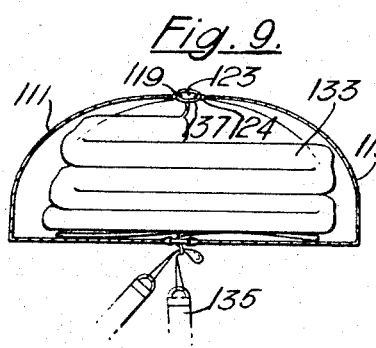
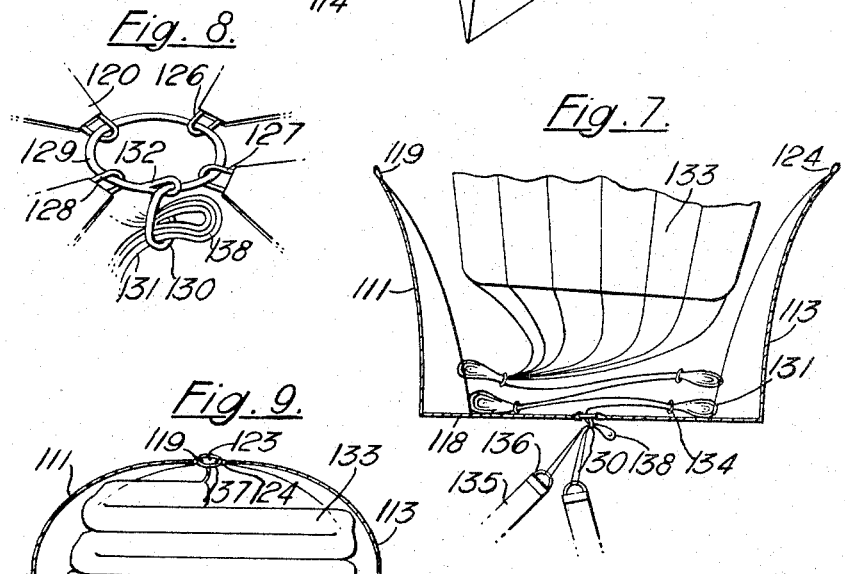
Inventor
JOHN ROTHWELL MITCHELL
By
Shoemaker and Mattare
Attorneys United States Patent Office 3,373,960
Patented Mar. 19, 1968

3,373,960
PARACHUTES
John Rothwell Mitchell, Woking, Surrey, England, assignor to G. Q. Parachute Company Limited, Woking, Surrey, England, a British company
Filed July 25, 1966, Ser. No. 567,656
Claims priority, application Great Britain, July 27, 1965, 32,078/65; Oct. 14, 1965, 43,623/65
6 Claims. (Cl. 244—148)

ABSTRACT OF THE DISCLOSURE parachute enclosed within an inner bag, the inner bag being composed of sections unattached to each other except through loops at each end thereof, the inner bag being enclosed within an outer bag, a force means also within the outer bag engaging the inner bag to force the inner bag and parachute from the outer bag upon opening of the outer bag, the outer bag having releasable means holding the same closed.

This invention relates to parachutes and particularly to means for releasing a parachute from its container.

The invention is particularly, but not exclusively, concerned with the release from its container of a parachute carried by a parachutist for use if the parachutist's main parachute does not open properly. Such a parachute is commonly known as a reserve parachute and it is necessary for the reserve parachute to to be thrown clear of the main parachute before the canopy of the reserve parachute is deployed.

The object of this invention is to provide a mechanism which will throw the reserve parachute away from the parachutist or from the load to be supported by the parachute. Hand ejection of the reserve parachute is possible if the mechanism is damaged, for example in a collision before deployment is required.

According to this invention a mechanism for releasing a parachute from its container comprises arms which are crossed and connected together by pivots in which springs or the like are connected to the arms so that when the container is opened the arms move about the pivots to force the parachute from the container.

Also according to this invention a mechanism for releasing a parachute from its container comprises a platform, a base, and arms which are crossed and connected together by pivots in which springs or the like are connected to the arms so that when the container is opened the arms move about the pivots and move the platform away from the base to force the parachute from the container.

The invention also comprises a container for a parachute comprising a canopy and rigging lines for connecting the canopy to a load, such as a parachutist, in which the container consists of an outer bag closed by a fastening which carries the canopy housed in an inner bag and a mechanism comprising a platform, a base, and arms which are crossed and connected together by pivots in which springs or the like are connected to the arms so that when the fastening of the outer bag is released the arms move about the pivots and move the platform away from the base to force the inner bag from the container.

Figure 5:
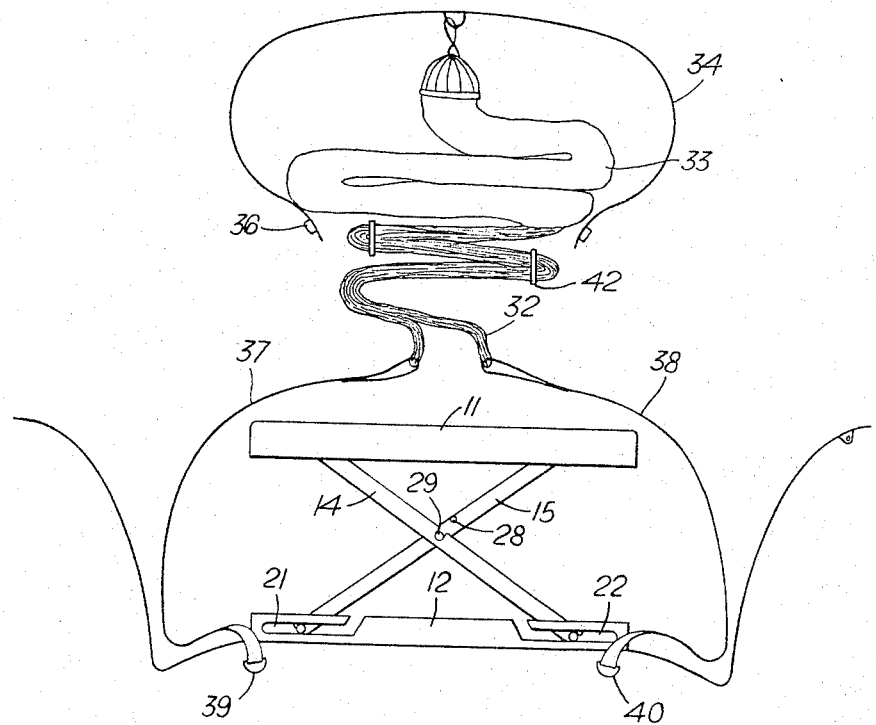

The invention is described hereinafter with reference to the accompanying drawings of which:

FIGURE 1 illustrates one form of mechanism according to the invention,

FIGURE 2 and FIGURE 3 each illustrate part of the mechanism shown in FIGURE 1,

FIGURE 4 illustrates one form of container according to the invention, the illustration being in section to show the packed parachute and the mechanism shown in FIGURE 1 ready for operation, FIGURE 5 illustrates in section the container shown in FIGURE 4 in a partly operated state, FIGURE 6 illustrates the inner bag in sections, FIGURE 7 shows a canopy about to be stowed in the inner bag, FIGURE 8 shows a method of connecting the sections at the base of the bag and FIGURE 9 shows the bag stowed ready for use.

The mechanism illustrated in FIGURES 1 to 3 comprises a platform 11 which is connected to a base 10 comprising bars 12 and 13 by arms 14, 15, 16, and 17.

The ends of all the arms are slotted as shown at 27 so that they can engage rods 18, 19, 25, and 26. Two of the arms 15 and 16 carry pins 29 at approximately their midpoints and pins 28 at points near the edges of the arms and adjacent the pins 29 as shown in the figures. The other two arms 14 and 17 have slots 30 at about their mid points which engage the pins 29 so that the arms are connected together by pivots. Instead of providing the arms with pins 28, 29 and slots 30, all the arms can be provided with holes at their central points and be joined together in pairs by rivets, nuts and bolts or similar connectors so that the arms are connected together by pivots.

The base bars 12 and 13 are provided with slots 21, 22 and 23, 24 respectively in which the ends of bars 18, 19 can slide, the slots being open to one edge of the base bar as shown at 31. Slots, not shown, are provided in the platform 11 in which the ends of rods 25, 26 can slide.

The rods 18, 19 and the rods 25, 26 are connected by tensioning means such as springs or elastics 20.

When required for use, the parts are assembled as shown in FIGURE 1. The elastics 20 are placed on the rods 18, 19, and 25, 26 and the rods are placed in the slots 21, 22, 23, and 24 in the base bars 12 and 13 and in the slots in the platform 11. The slotted ends of the arms 14 and 17 are placed on the rods 19 and 25 and the slotted ends of the arms 15 and 16 are placed on the rods 18 and 26. The pins 29 on the arms 15 and 16 are placed in the slots 30 in arms 14 and 17 and the platform is pressed towards the base bars 12 and 13 to form the compact unit shown in FIGURE 4. The platform 11 can be made so that the sides of the platform close down over the base bars 12 and 13.

The mechanism can be used in a pack which houses the canopy in an inner bag. One such inner bag is illustrated in FIGURES 6 to 9.

The bag illustrated in the FIGURES 6 to 9 consists of four sections 111, 112, 113 and 114 which are connected to form the bag by means of loops 119, 123, 124, and 125 at the tops of the sections and loops 120, 126, 127, and 128 at the ends of the section which form the base of the bag. Each of the sections consists essentially of two substantially triangular pieces of material, such as the pieces 115 and 118 of section 111, the pieces such as 115 forming the sides and top of the bag and the pieces such as 118 forming the base of the bag.

The pieces such as 115 are provided at their apices with loops 119, 123, 124, and 125, and the pieces such as 118 are provided with loops 120, 126, 127, and 128 at their apices. The pieces are joined together at their bases to form the quadrilateral sections 111, 112, 113, and 114. These sections could be cut to the shapes required from a single piece of material, or made from any number of pieces of material joined together.

The section 111 is provided with strips 116 and 117 which are joined to the side edges of the piece 115 and to the base piece 118, as shown in FIGURE 6, to form covers for the corners of the bag. Similar strips are provided on the section 113. Stiffening members 121 are provided for the lower part of the side piece 115 and for the corner covers 116 and 117. These can be pieces of polythene sheet inserted in pockets provided on the piece 115 and on the strips 116 and 117. The base piece 118 is provided with a stiffening member 122 between the strips 116 and 117. Similar stiffening members are provided on section 113. Stiffening members similar to that on piece 115 are provided on sections 112 and 114. An elastic strip 139 is provided along the outside of each section from a point near the apex ring to a point near the base closure loop. This can be attached at the ends only or along the length of the strip, for example it could be passed through a tunnel provided by stitching a piece of material onto the section. The elastic should stretch when the bag is packed so that it is under sufficient tension to turn the bag inside out when the mouth is opened. This ensures that the whole of the canopy is exposed to the air stream.

The base of the bag is held together by a tape 129 having a loop 130, 132 at each end, which is passed through the loops 120, 126, 127 and 128 and through its end loop 132. The tape is secured by a bight 138 in rigging lines 131 which is passed through the loop 130 on tape 129. The rigging lines 131 are connected to rings 136 on risers 135 attached to the load.

To stow a canopy in the bag, the four sections are connected together at the base by the tape 129 and by a bight in the parachute rigging lines 131 as described above and shown in FIGURES 7 and 8, and the rigging lines are then folded onto the base of the bag, the bights in the rigging lines which are formed as the rigging lines are stowed being held by elastic bands 134. After the rigging lines have been folded onto the base of the bag, the canopy 133 of the parachute is lowered onto the stowed rigging lines. The four sections of the bag are then closed together over the stowed canopy and are tied together and to the apex of the canopy by a tie 137 which is passed through the loops 119, 123, 124, and 125 on the sections 111, 112, 113 and 114 of the bag. The bag is then ready for use. It will be noted that there is no stress on the bag whilst the locking loop is being applied to the base loops 120, 126, 127, and 128.

When the canopy is to be deployed, the bag is projected from the load as described hereinafter. When the risers 135 are fully extended, the kinetic energy of the moving bag pulls the bight 138 in the rigging lines 131 out of the loop 130 so that the tape 129 slips out of the loops 120, 126, 127, and 128 to open the base of the bag. The remainder of the rigging lines are extended and the canopy 133 is deployed. The tie 137 remains attached to the bag and the canopy so that the sections of the bag remain tied together and to the apex of the canopy and are recovered with the canopy for further use.

The bag could comprise more or less than four sections, the corner covering strips need not be provided, or could be provided one on each section rather than two on some sections and none on the other sections. The stiffening members are not essential and the pockets for these could be open so that stiffening members could be inserted as and when required. The rigging lines could be stowed outside the bag and provision for them could be provided on one or more of the sections.

The bight 138 which locks the base opening could be made at a point adjacent the canopy 133 so that the base opening is not released until the rigging lines are fully extended.

FIGURES 4 and 5 illustrate the mechanism in use. As shown in FIGURE 4, the mechanism is folded so that only the edge of the platform 11 is seen. The rigging lines 32 and canopy 33 of a parachute are stowed in an inner bag 34 above the platform 11, the bights in the folded rigging lines being held by elastic bands 42 as shown in FIGURE 5. The rigging lines are connected to risers 37, 38 which are connected to a parachute harness, not shown, by rings 39, 40. The inner bag 34 has a mouth lock 36 at its base. Some or all of the rigging lines can be enclosed by the inner bag 34 and the mouth lock 36 is fastened by a bight in the rigging lines 32.

The inner bag and the mechanism are enclosed in an outer bag 35 which is fastened by a fastener 41.

When the parachute is to be deployed, the fastener 41 holding the outer bag 35 closed is released. This allows the springs or elastics 20 to pull the rods 18, 19 and 25, 26 together and platform 11 is lifted away from the base bars 12 and 13. This movement forces the inner bag 34 away from the parachutist and extends the risers 37, 38. When the risers and rigging lines are extended the mouth lock 36 opens as explained above so that the mouth in the base of the inner bag opens. The inner bag falls apart and turns inside out so that the canopy 33 is thrown into airstream and deployed. The parts of the inner bag 34 are tied to the apex of the canopy 33.

As the arms of the mechanism are drawn together by the springs or elastics 20, the pins 28 on the arms 15 and 16 engage the sides of arms 14 and 17 and the pins 29 are forced out of the slots 30. This allows the arms to separate so that the mechanism divides into its parts and the parts fall separately to the ground. The parts can be connected together if desired, for example by means of a cord, so that the parts fall together and can be collected as an assembly, or the parts can remain attached to the outer bag.

The parts of the mechanism are conveniently made from a plastics material.

The assembly can be constructed so that the springs or elastics 20 are in a relaxed state whilst the unit is in store. For example, one end of each of the springs could be attached to a wire and the wire could be provided with means at the end remote from the spring to fasten the wire to a point on the pack or, if adjacent springs have the wires connected at alternate ends, to the end of the adjacent wire. The springs could be tensioned when the assembly is about to be used by pulling the wires out and fixing the ends to the fixings provided so that the springs are tensioned. The provision of a number of springs each with a separate wire makes tensioning easy. An indicator can be provided to indicate when the device is tensioned: for example the wires could be coated with a day glow plastics material, the coating being inside the pack until the wire has been pulled out for anchoring to its fixing.

Springs or elastics could be provided only between the rods 25, 26 or the rods 18, 19 if desired and the arms could be provided with holes to accommodate the ends of the rods instead of the slots 27. The mechanism can be reversed in use so that the base bars rest against the inner bag, and the platform, or base bars, could be attached to or form part of the outer bag 35 if desired as shown in FIGS. 4 and 5.

The invention is not restricted to the embodiment described above.

Having described my invention, what I claim as new and desire to secure by Letters Patent is:

1. A container for a parachute comprising a canopy and rigging lines for connecting the canopy to a load, such as a parachutist, in which the container consists of an outer bag closed by a fastening which carries the canopy housed in an inner bag, the inner bag being entirely within the outer bag, and a mechanism comprising a platform component, a base component, and arms, the arms being crossed and connected together by pivots adjacent their centers, spring means carried by the platform and base and connected to the arms so that when the fastening of the outer bag is released the arms move about the pivots through the force of the spring means and move the platform away from the base to force the inner bag from the container.

2. A container for a parachute comprising a canopy and rigging lines for connecting the canopy to a load, such as a parachutist, in which the container consists of an outer bag closed by a fastening which carries the canopy housed in an inner bag the inner bag being entirely within the outer bag, and a mechanism which forces the inner bag from the container when the fastener of the outer bag is released, the inner bag comprising a plurality of separate sections which are releasably connected together at the top and at the base of the inner bag, the connection at the base of the inner bag being released when the canopy is to be deployed so that the sections fall apart to release the canopy.

3. A container as claimed in claim 1 in which one of the components is connected to the said container.

4. A container as claimed in claim 2 in which the top and base of each of the sections is provided with loops which loops are used to connect the sections together.

5. A container as claimed in claim 2 in which the connection at the base of the inner bag is secured by a bight in the rigging lines of the parachute so that when the rigging lines are extended, the connection at the base of the bag is released to allow the sections to fall apart and release the canopy.

6. A container as claimed in claim 2 in which the sections are provided with means to help turn them inside out when released to expose the canopy to the air stream.

References Cited
UNITED STATES PATENTS

| | | | |
|---|---|---|---|
| 1,462,456 | 7/1923 | Smith | 244—148 |
| 2,519,923 | 8/1950 | Noelcke | 244—148 |
| 2,611,565 | 9/1952 | Quilter | 244—148 X |

FOREIGN PATENTS

| | | |
|---|---|---|
| 1,166,406 | 6/1958 | France. |

MILTON BUCHLER, *Primary Examiner.*

R. A. DORNON, *Assistant Examiner.*